United States Patent [19]

Solar

[11] Patent Number: 4,764,808

[45] Date of Patent: Aug. 16, 1988

[54] MONITORING SYSTEM AND METHOD FOR DETERMINING CHANNEL RECEPTION OF VIDEO RECEIVERS

[75] Inventor: Carl M. Solar, Largo, Fla.

[73] Assignee: A. C. Nielsen Company, Northbrook, Ill.

[21] Appl. No.: 46,118

[22] Filed: May 5, 1987

[51] Int. Cl.⁴ .................... H04N 17/04; H04H 9/00
[52] U.S. Cl. .................................................. 358/84
[58] Field of Search ............................. 358/84; 455/2

[56] References Cited

U.S. PATENT DOCUMENTS

| | | | |
|---|---|---|---|
| 2,903,508 | 9/1959 | Hathaway | 455/2 X |
| 3,312,900 | 4/1967 | Jaffe | 358/84 |
| 3,372,233 | 3/1968 | Currey | 358/84 |
| 3,803,349 | 4/1974 | Watanabe | 358/84 |
| 4,577,220 | 3/1986 | Laxton et al. | 358/84 |
| 4,622,583 | 11/1986 | Watanabe et al. | 358/84 |
| 4,635,109 | 1/1987 | Comeau | 358/84 |
| 4,723,302 | 2/1988 | Fulmer et al. | 455/2 |

FOREIGN PATENT DOCUMENTS

| | | | |
|---|---|---|---|
| 3401762 | 8/1985 | Fed. Rep. of Germany | 358/84 |
| 2471089 | 6/1981 | France | 358/84 |

Primary Examiner—Keith E. George
Attorney, Agent, or Firm—Mason, Kolehmainen, Rathburn & Wyss

[57] ABSTRACT

A system and method are provided for determining the broadcast signal source for the signal being displayed by a video wave receiver, whether tuned by the monitored receiver or an associated tuner device, such as a cable converter or video cassette recorder. The monitoring system includes a probe for detecting a horizontal sweep signal of the monitored receiver. The frequency of the detected horizontal sweep signal is determined and compared to stored characteristic frequency values corresponding to the predetermined channels to which the video receiver may be tuned.

12 Claims, 1 Drawing Sheet

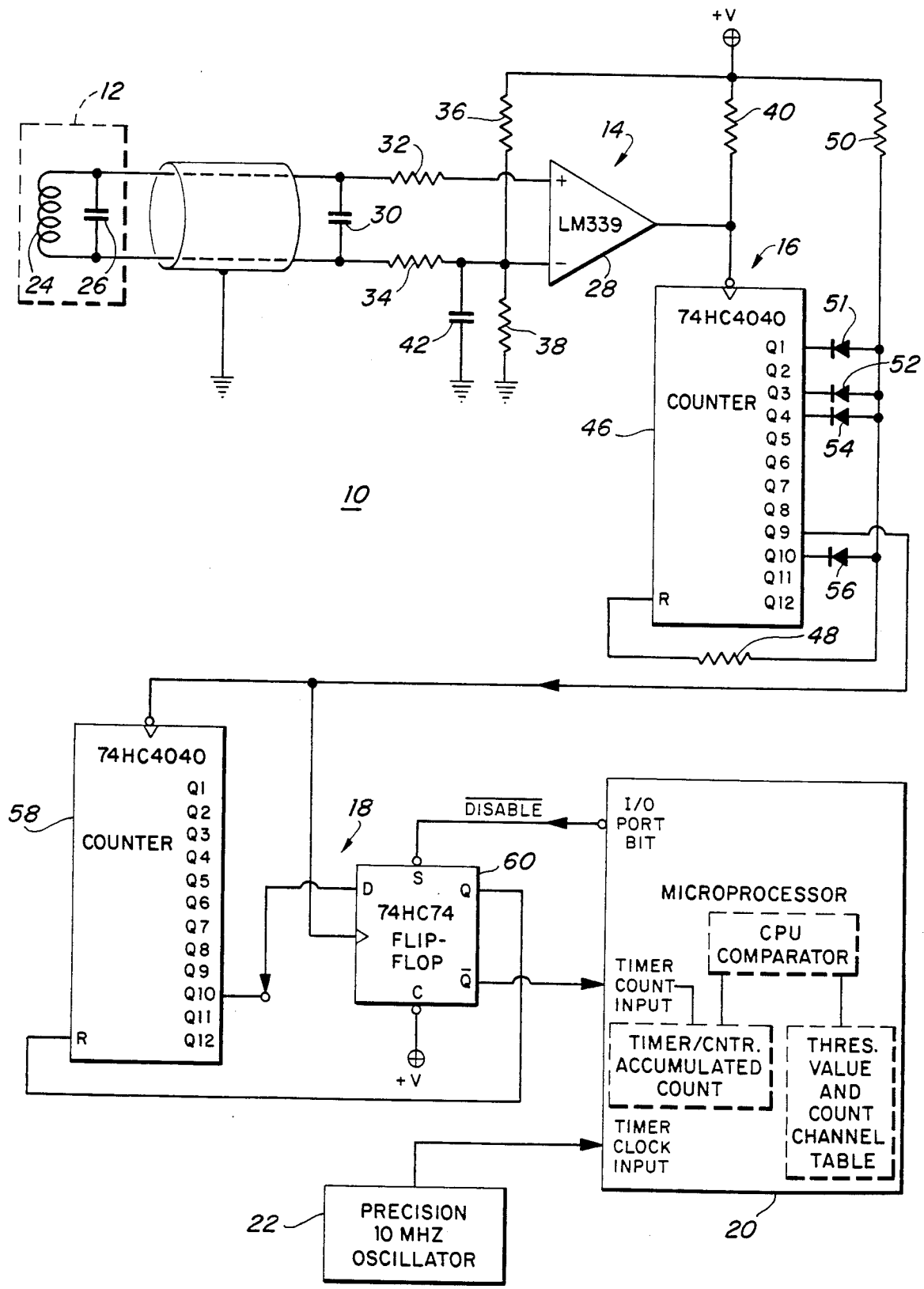

MONITORING SYSTEM AND METHOD FOR DETERMINING CHANNEL RECEPTION OF VIDEO RECEIVERS

BACKGROUND OF THE INVENTION

1. Field of the Invention

The present invention relates generally to a method and apparatus for monitoring video receivers, and more particularly to a method and apparatus for determining the channel reception and the broadcast signal source of the signal being displayed by a monitored receiver.

2. Description Of The Prior Art

Various arrangements have been employed to determine the channel to which a television receiver is tuned. A disadvantage of many known monitoring arrangements is that an internal connection to the television receiver is required. For example, U.S. Pat. No. 3,973,206 issued to Haselwood, et al. on Aug. 3, 1976 discloses a method of determining channel tuning by monitoring the varactor diode tuning voltage and thus, required internal connections in the television receiver.

Another method for determining channel tuning disclosed in U.S. Pat. No. 4,425,578 issued to Haselwood et al. on Jan. 10, 1984 utilizes a signal injection source and a detector/receiver arranged to detect the combined signal from the injection signal source and a video carrier to which the video receiver is tuned. A significant drawback of signal injection monitoring arrangements is potential interference with the functional operation of the video receiver being monitored.

Other known arrangements have utilized a local oscillator frequency measurement of the monitored receiver to determine channel tuning. However, known local oscillator measurements are prone to errors caused by extraneous signals and can interfere with normal operation of the monitored video receiver.

A further difficulty with such conventional arrangements results from the increasing use of video cassette recorders and cable and pay television systems in conjunction with the television receiver requiring monitoring of the associated tuner device. Access to the associated tuner device may not be possible; however, where access is possible, the overall complexity of conventional monitoring systems is substantially increased.

SUMMARY OF THE INVENTION

It is an object of the present invention to provide a method and apparatus determining the channel reception of a plurality of predetermined channels to which a receiver is tuned that overcomes many of the disadvantages of the prior art systems.

It is another object of the present invention to provide an improved method and apparatus for determining the broadcast signal source of a signal being displayed by a monitored receiver whether tuned by the monitored receiver or an associated tuner device, such as a cable converter or video cassette recorder.

Therefore, in accordance with a preferred embodiment of the invention, there are provided method and apparatus for determining the broadcast signal source of a plurality of predetermined broadcast signal sources of a signal being displayed by a monitored receiver. A sensor is positioned proximate to the monitored receiver for detecting a horizontal sweep signal of the monitor receiver. A frequency value of the detected signal is determined and compared with a plurality of stored characteristic frequencies to identify the broadcast signal source.

DESCRIPTION OF THE DRAWING

These and other objects and advantages of the present invention will become readily apparent upon consideration of the following detailed description and the attached drawing wherein:

The single FIGURE is an electrical schematic representation of the channel reception detection apparatus according to the present invention.

DETAILED DESCRIPTION OF THE PREFERRED EMBODIMENT

Referring now to the drawing, there is illustrated an electrical schematic representation of a new and improved channel reception detection apparatus according to the invention generally designated by the reference numeral 10. The channel reception detection apparatus 10 is used for determining which of a plurality of predetermined broadcast signal sources or stations is transmitting the signal being displayed by a monitored receiver.

The channel reception detection apparatus 10 includes a detector or sensor 12 positioned proximate to a monitored receiver (not shown) for detecting a radiated signal of the monitored receiver, such as a characteristic frequency of the horizontal sweep signal. The channel reception detection apparatus 10 includes a zero crossing detector 14 for amplifying the detected signal, a first divider circuit 16 for providing an average frequency detected signal, a counter gate circuit 18 for identifying a predetermined number of cycles of the average frequency detected signal and a processor device such as a microprocessor 20 for performing logical and control operations. An associated precision oscillator 22, such as a 10 MHz crystal oscillator, is employed for providing a high frequency clock timing signal to the microprocessor 20.

The sensor 12 may include an inductor 24 and a capacitor 26 connected in parallel and tuned for detecting a horizontal deflection or sweep signal of the monitored receiver. The receiver's horizontal sweep signal is derived directly from a received stable color reference frequency signal or "color burst" signal. The color burst signal is a reference signal used for demodulating the chrominance signal including a few cycles of a sine wave of chrominance subcarrier frequency, such as 10 cycles at a frequency of about 3.579545 MHz, following each horizontal synchronizing signal. A stable quartz crystal oscillator is typically used as the reference source by the local broadcasting stations, including network affiliated stations to generate this color burst signal at the frequency of 3.579545 MHz plus or minus 10 Hz. The horizontal sweep signal has a frequency equal to the color burst's frequency multiplied by 2/455 or about 15.7 KHz. The resulting horizontal sweep signal varies for each of the local broadcasting stations in direct relation to the stations crystal oscillator's deviation in the range of plus or minus 10 Hz from 3.579545 MHz. The sensor 12 is tuned to about 15.7 KHz for detecting the radiated horizontal sweep signal. The sensor 12 is also used to identify the ON/OFF operational mode of the monitored receiver with an unstable, absent or out-of-tolerance frequency indicating that the monitored receiver is OFF or the tuned station is not broadcasting.

A detected signal of the sensor 12 is applied to the zero crossing detector 14 by a direct connection via a coaxial cable of the desired length such as 6 ft. The zero crossing detector 14 includes a high speed and high gain comparator, for example, such as an integrated circuit device type LM339 manufactured and sold by Motorola, Inc. A capacitor 30 is connected across the signal output of the sensor 12 and to a resistor 32 connected to a non-inverting input of the comparator 28 and to a resistor 34 connected to an inverting input of the comparator. A voltage divider arrangement of a pair of resistors 36 and 38 is connected in series between a supply voltage +V and ground at their junction to the inverting input of comparator 28. A biasing resistor 40 is connected between the supply voltage +V and the output of the comparator 28. A capacitor 42 is coupled between the inverting input and ground of comparator 28. The comparator 28 as configured provides a logic level output signal corresponding to the detected signal of sensor 12.

The first divider circuit 16 includes a 12-bit binary counter 46, such as an integrated circuit device type MC14040B manufactured and sold by Motorola, Inc. A pair of series connected resistors 48 and 50 are connected between a reset input R of the counter 46 and the supply voltage +V. A plurality of diodes 51, 52, 54 and 56 are connected between the junction of the series connected resistors 48 and 50 and the respective Q1, Q3, Q4 and Q10 outputs of the 12-bit binary counter 46. The logic level output signal of comparator 28 is applied to a clock input of the 12-bit counter 46 that is configured to provide a divide by, for example, 525 at its Q9 output. The output signal of the first divider circuit 16 has a frequency equal to the detected frequency signal divided by 525 or about 29.97 hertz. This division ratio is selected to provide an average detected horizontal sweep frequency of 525 counts in order to cancel horizontal phase shifts that normally occur during the vertical retrace periods.

The Q9 output of counter 46 is applied to the clock inputs of a 12-bit binary counter 58 and a D-type flip-flop 60 of the counter gate circuit 18. An identical integrated circuit device type may be employed for the 12-bit binary counter 58 as is used for the 12-bit binary counter 46. An integrated circuit device type SN74HC74 such as manufactured and sold by Motorola, Inc. may be used for the D-type flip-flop 60. An enable signal is applied to the Set input of the D-type flip-flop 60 by the microprocessor 20, as shown at a line $\overline{\text{DISABLE}}$. The clear input C of the flip-flop 60 is connected to the supply voltage +V. The D input of the flip-flop 60 is connected to the Q10 output of the 12-bit binary counter 58. The Q output of flip-flop 60 is applied to the Reset input of the counter 58 and the $\overline{\text{Q}}$ output is applied to the timer counter input of the microprocessor 20. The counter gate circuit 18 is configured to determine a counting time period equal to 512 output cycles of the first divider circuit 16. This provides a counting time period of about 17 seconds; however, a different output, e.g., the Q9 output could be used with the counting time period reduced by a factor of 2. The counting time interval is proportional to the measurement accuracy and thus must be a sufficient time interval to enable accurately identifying the channel reception.

The microprocessor 20 initiates the counting sequence by applying an enable signal at the line $\overline{\text{DISABLE}}$. An internal timer/counter circuit of microprocessor 20 accumulates clock oscillator counts corresponding to the oscillator signal of the precision oscillator 22 during the time period equal to 512 frame cycles determined by the counter gate circuit 18. An accumulated count that is less than a minimum predetermined threshold value or greater than a maximum predetermined threshold value indicates an OFF operational mode of the monitored receiver. The accumulated total count is compared with a stored count channel table to identify the corresponding channel of the monitored receiver. The stored count channel table is determined when the channel reception detection apparatus 10 is installed by tuning the monitored receiver to each of the channels that may be received and storing the corresponding count value and channel identification within the microprocessor 20 to form the count channel table.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. A method for determining the broadcast signal source of a plurality of predetermined broadcast signal sources of a signal being displayed by a monitored receiver comprising the steps of:
   detecting a horizontal sweep signal of the monitored receiver;
   determining the frequency of said detected horizontal sweep signal; and
   comparing said determined frequency with a plurality of stored characteristic frequencies to identify the broadcast signal source.

2. A method as recited in claim 1 wherein said step of detecting a horizontal sweep signal of the monitored receiver includes the steps of providing a tuned circuit sensor proximate to the monitored receiver and detecting a radiated signal of the monitored receiver.

3. A method as recited in claim 1 wherein the step of determining the frequency of said detected horizontal sweep signal includes the steps of processing said detected horizontal sweep signal to obtain a detected average frequency signal; identifying a predetermined number of cycles of said detected average frequency signal; providing a periodic timing signal and generating a count responsive to said timing signal and said identified predetermined number of cycles.

4. A method as recited in claim 3 wherein said step of processing said detected horizontal sweep signal to obtain detected average frequency signal; includes the steps of applying said detected horizontal sweep signal to a zero crossing detector and applying an output signal of said zero crossing detector to a counter for dividing by a predefined number.

5. A method as recited in claim 3 wherein said step of generating a count responsive to said timing signal and said identified predetermined number of cycles of said detected average frequency signal includes the steps of providing an enable signal; identifying said predefined number of cycles of said detected average frequency signal responsive to said enable signal to determine a counting interval; providing an oscillator clock signal and accumulating said clock signal during said determined counting interval.

6. A method as recited in claim 1, further including the steps of comparing said determined frequency with a first and a second predefined threshold value to identify an OFF operational mode of the monitored receiver.

7. Apparatus for determining the broadcast signal source of a plurality of predetermined broadcast signal sources of the signal being displayed by a monitored video wave receiver comprising:

means for detecting a horizontal sweep signal of the monitored receiver;

means for determining the frequency of said detected horizontal sweep signal; and means for comparing said determined frequency with a plurality of stored characteristic frequencies to identify the broadcast signal source.

8. Apparatus as recited in claim 7 wherein said means for detecting a horizontal sweep signal of the monitored receiver comprises a tuned circuit sensor, said sensor being positioned proximate to the monitored receiver.

9. Apparatus as recited in claim 7 wherein said means for determining the frequency of said detected horizontal sweep signal comprises means for amplifying said detected signal, and first divider means for providing an average frequency detected signal.

10. Apparatus as recited in claim 9 further comprises counter gate means for identifying a predetermined number of cycles of said average frequency detected signal; means for generating a periodic timing signal; and counter means responsive to said predetermined number of cycles identifying means for counting said periodic timing signal and accumulating a count.

11. Apparatus as recited in claim 10 wherein said means for comparing said determined frequency with a plurality of stored characteristic frequencies includes memory means for storing a plurality of count values, one value corresponding to each of the predetermined broadcast signal sources, and means for comparing said accumulated count with said plurality of stored count values to identify the brodcast signal source.

12. Apparatus for determining the channel reception of a plurality of predetermined channels to which a monitored receiver is tuned comprising:

sensor means for detecting a radiated signal of said monitored receiver, said sensor means being tuned circuitry for detecting a horizontal sweep signal thereof;

frequency divider means responsive to said detected signal for producing an average frequency detected signal;

microprocessor means for providing an enable signal;

oscillator means for providing a periodic timing signal to said microprocessor means;

counter gate means responsive to said enable signal and said average frequency detected signal for identifying a predetermined number of cycles of said average frequency detected signal to determine a counting interval;

said microprocessor means including means for accumulating said periodic timing signal during said determined counting interval; means for storing a plurality of count values, one count value corresponding to each of the predetermined channels; and means for comparing said accumulated count with said plurality of stored count values to identify the channel reception.

* * * * *